(12) United States Patent
Kangas et al.

(10) Patent No.: US 7,464,472 B2
(45) Date of Patent: Dec. 16, 2008

(54) PIPE CUTTING APPARATUS

(75) Inventors: Timo Kangas, Laihia (FI); Matti Lehtimaki, Laihia (FI); Esko Hakola, Vahakyro (FI); Pertti Lehto, Laihia (FI)

(73) Assignee: T-Drill Oy, Laihia (FI)

( * ) Notice: Subject to any disclaimer, the term of this patent is extended or adjusted under 35 U.S.C. 154(b) by 0 days.

(21) Appl. No.: 10/594,411

(22) PCT Filed: Mar. 24, 2005

(86) PCT No.: PCT/FI2005/050107

§ 371 (c)(1),
(2), (4) Date: Jun. 11, 2007

(87) PCT Pub. No.: WO2005/092550

PCT Pub. Date: Oct. 6, 2005

(65) Prior Publication Data

US 2007/0240311 A1 Oct. 18, 2007

(30) Foreign Application Priority Data

Mar. 26, 2004 (FI) .................................. 20045103

(51) Int. Cl.
*B23D 21/06* (2006.01)
(52) U.S. Cl. .................................. 30/101; 30/96; 30/97
(58) Field of Classification Search .................... 30/93, 30/94, 95, 96, 97, 98, 99, 101, 102
See application file for complete search history.

(56) References Cited

U.S. PATENT DOCUMENTS

| | | | | |
|---|---|---|---|---|
| 4,111,346 A | * | 9/1978 | Bertolette | 225/96.5 |
| 4,769,911 A | * | 9/1988 | Araki | 30/94 |
| 5,243,760 A | * | 9/1993 | May, Jr. | 30/101 |
| 6,065,212 A | * | 5/2000 | Lazarevic | 30/101 |
| 6,430,815 B1 | * | 8/2002 | Wickline | 30/101 |

* cited by examiner

*Primary Examiner*—Hwei-Siu C Payer
(74) *Attorney, Agent, or Firm*—Klauber & Jackson, LLC

(57) ABSTRACT

The invention relates to a pipe cutting apparatus, comprising a body, a cutter head (1) bearing-mounted rotatably on the body, having a centre rotation axis (C) and having a cutting gap (2) which opens radially sideways for receiving a pipe to be cut, pipe securing elements (8) for fixing the pipe on said centre rotation axis (C) immovably relative to the body, the cutter head (1) being provided with support rolls (21) for supporting the pipe during a cutting process. The cutter head (1) includes a cutting blade (22) in the shape of a sharp-edged disk, which, during rotation of the cutter head (1), is adapted to be advanced towards the centre rotation axis (C) for cutting the pipe by chipless cutting. The cutter head (1) is further provided with a shifting and locking mechanism (12-20, 28-40) for the support rolls (21), which, regardless of the diameter of a pipe to be cut, shifts and locks the support rolls (21) with a single drive and/or control against the surface of a pipe for said cutting support.

5 Claims, 7 Drawing Sheets

PIPE CUTTING APPARATUS

CROSS REFERENCE TO RELATED APPLICATIONS

The present application is a National Stage Application claiming the priority of co-pending PCT Application No. PCT/FI2005/050107 filed Mar. 24, 2005, which in turn, claims priority from Finnish Patent Application Serial No. 20045103, filed Mar. 26, 2004. Applicants claim the benefits of 35 U.S.C. § 120 as to the PCT application and priority under 35 U.S.C. § 119 as to the said Finnish application, and the entire disclosures of both applications are incorporated herein by reference in their entireties.

The invention relates to a pipe cutting apparatus, comprising a body, a cutter head bearing-mounted rotatably on the body, having a centre rotation axis and having a cutting gap which opens radially sideways for receiving a pipe to be cut, pipe securing elements for fixing the pipe on said centre rotation axis immovably relative to the body, support rolls in the cutter head for supporting the pipe during a cutting process, and a cutting blade in the shape of a sharp-edged disk present in the cutter head, which, during rotation of the cutter head, is adapted to be advanced towards the centre rotation axis for cutting the pipe by chipless cutting.

This type of pipe cutting devices are known e.g. from patent publications U.S. Pat. Nos. 4,111,346 and 6,065,212. The latter comprises two concentric gears adapted for relative rotation, and a cutting blade is mounted on one of the gears. Both the cutting blade and support rolls must be conveyed by means of a separate motor drive to a cutting position and returned to a home position by means of a reversed motor drive. This hampers and complicates operation of the apparatus.

It is an object of the invention to provide an improved pipe cutting apparatus, wherein support rolls are shifted and locked with a single drive and/or control, regardless of a pipe diameter, against the pipe surface for cutting support. This object is achieved on the basis of characterizing features of the invention as set forth in the appended claim 1. A more detailed implementation for a preferred exemplary embodiment of the invention is set forth in the dependent claims.

Figure 1:
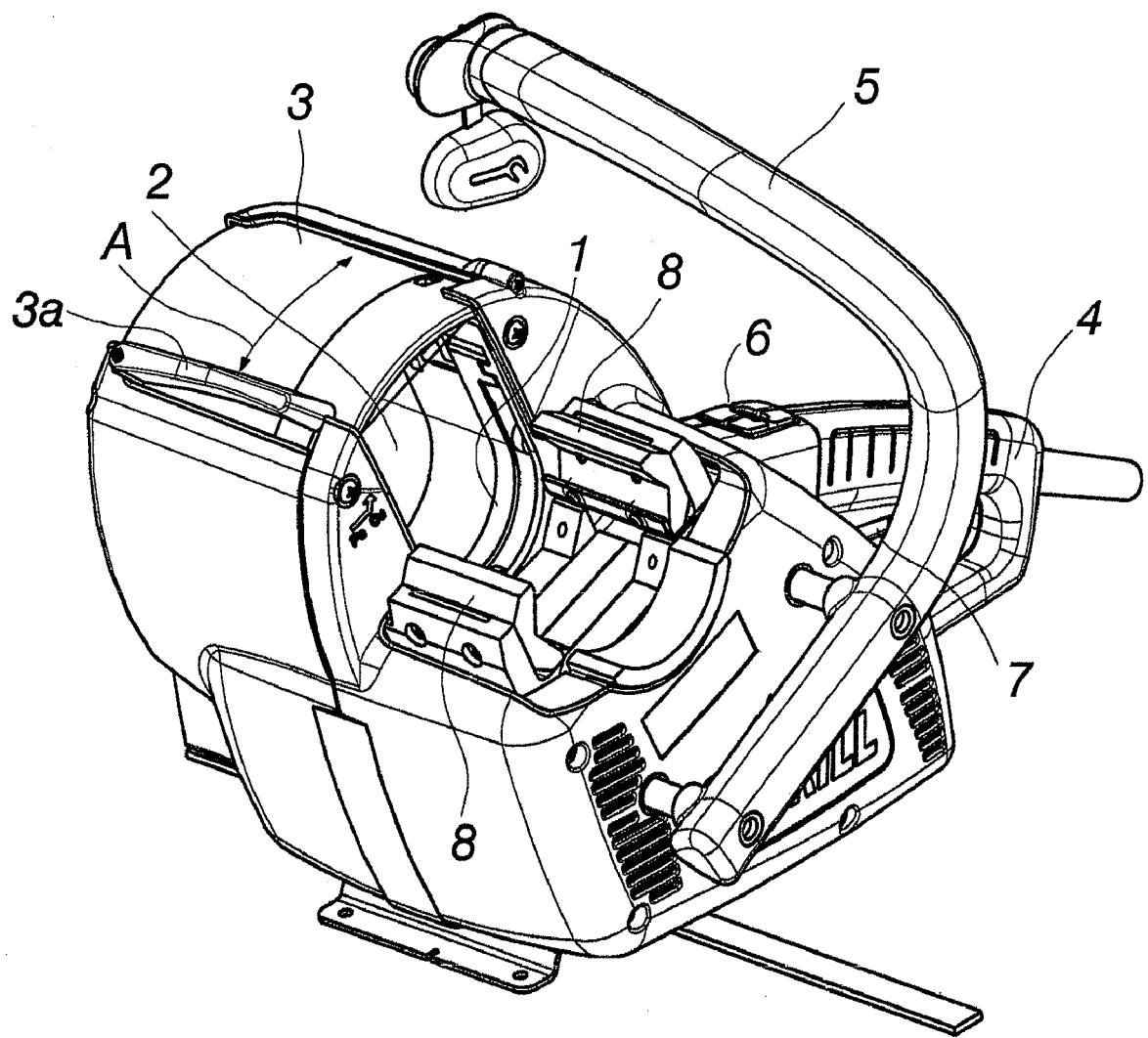
Figure 2:
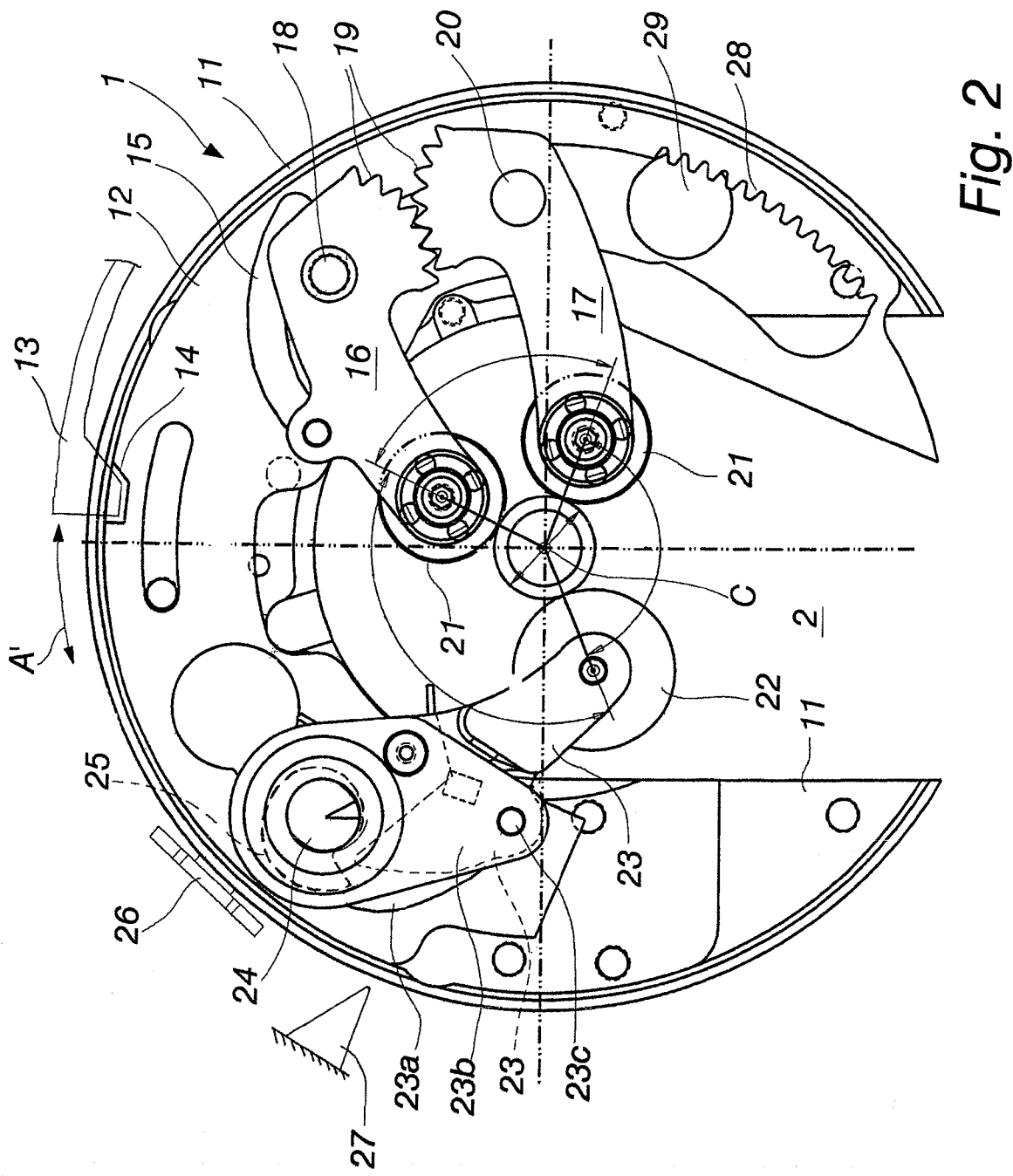
Figure 3:
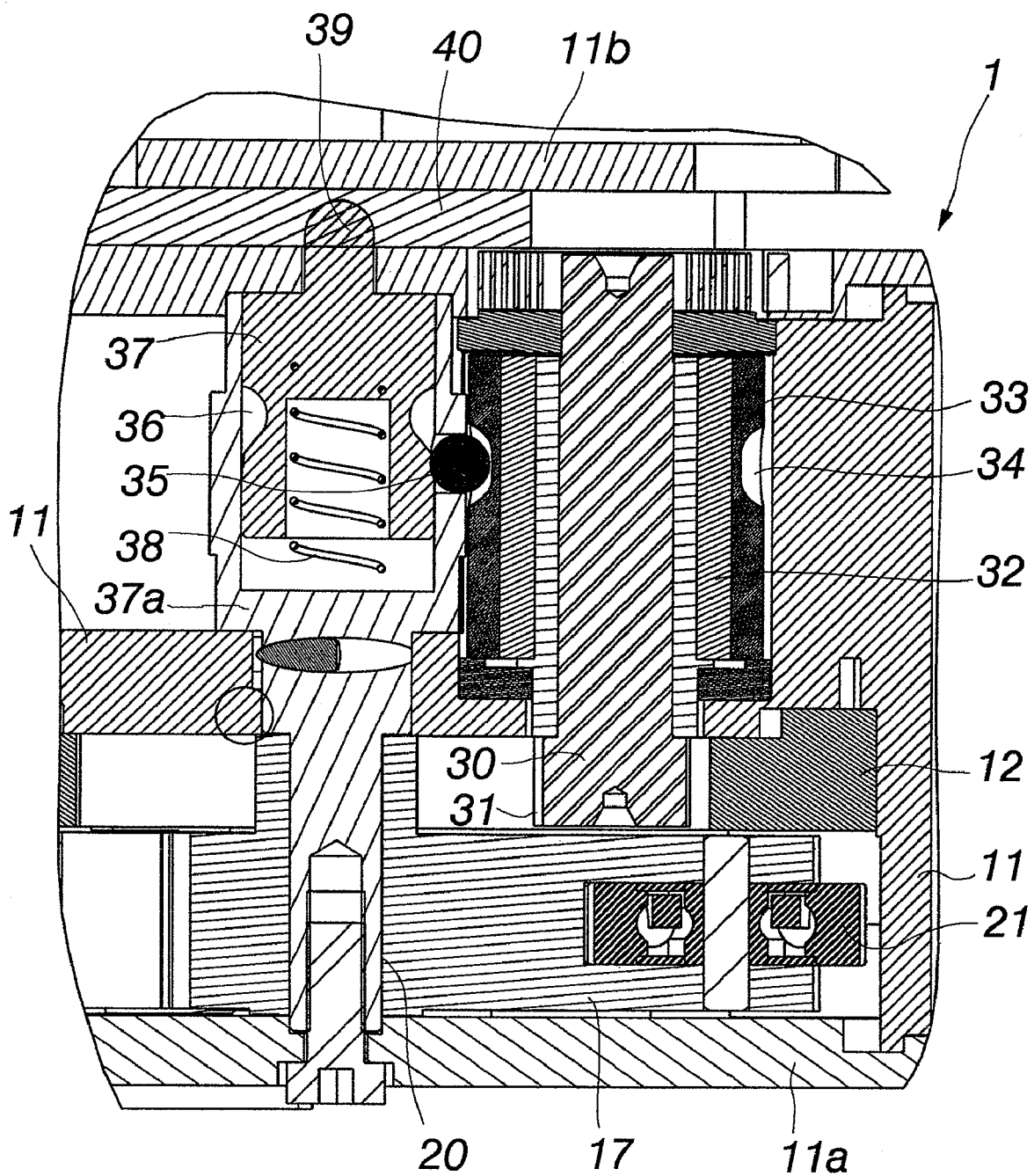
Figure 4:
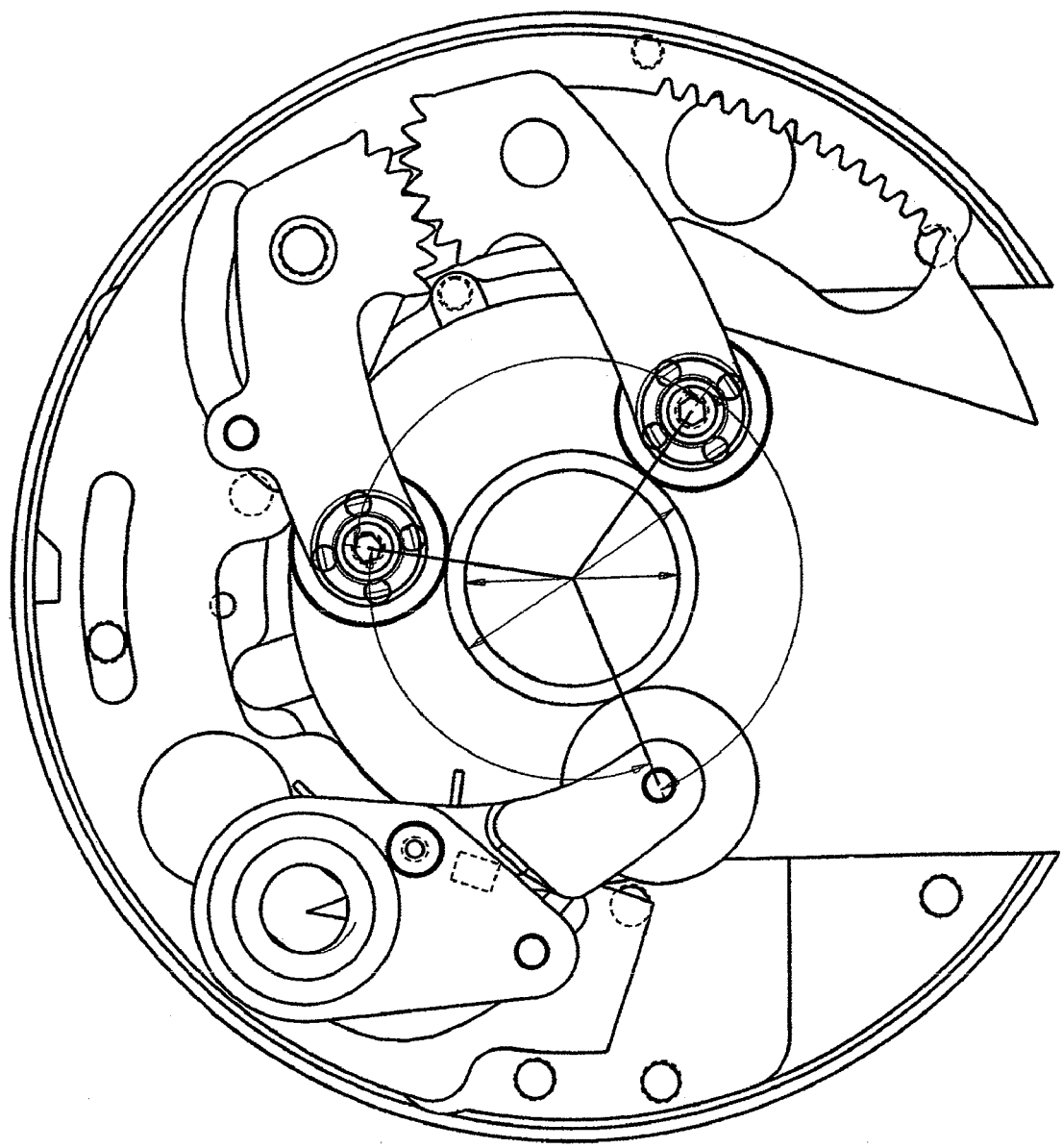
Figure 5:
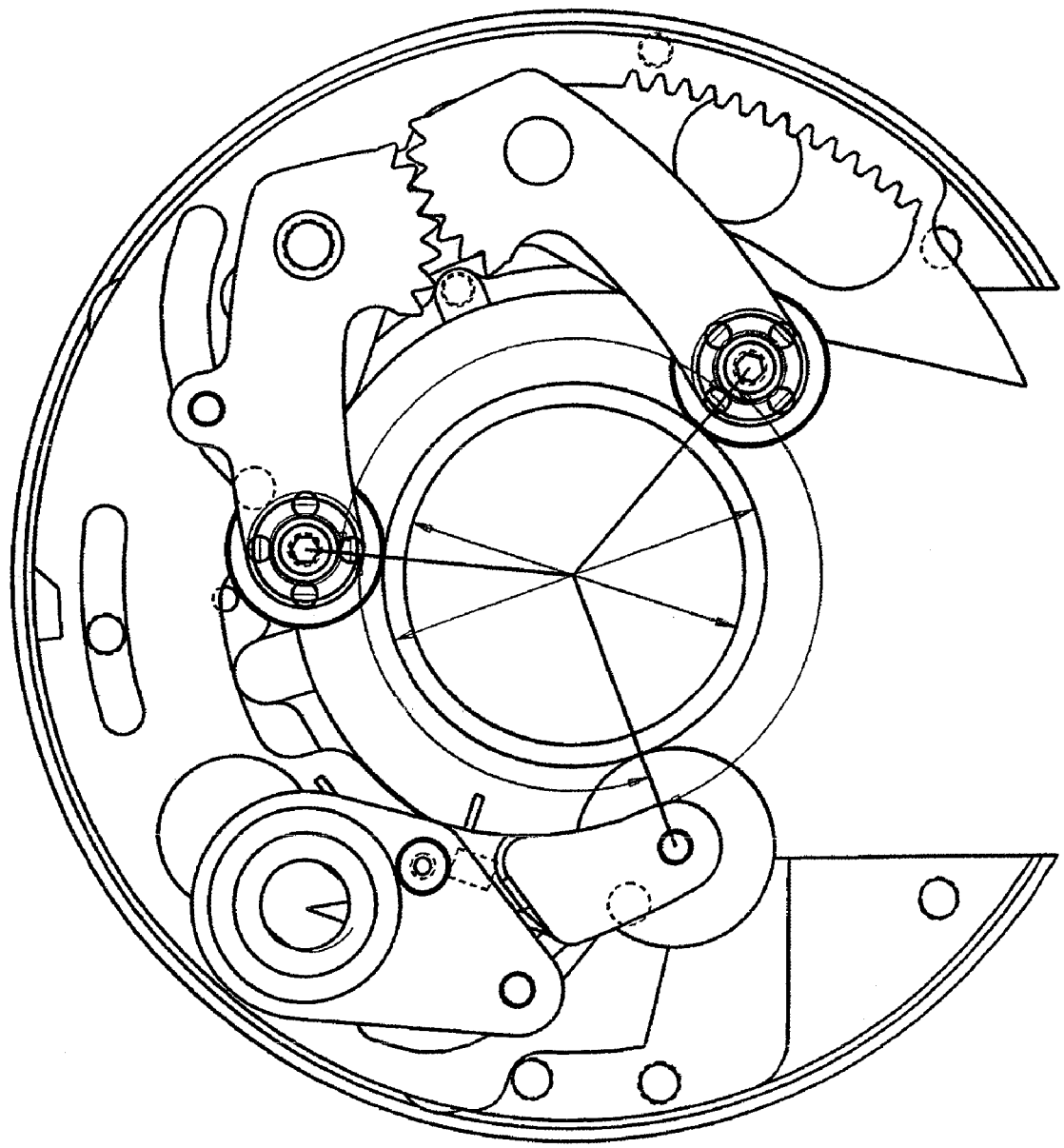
Figure 6:
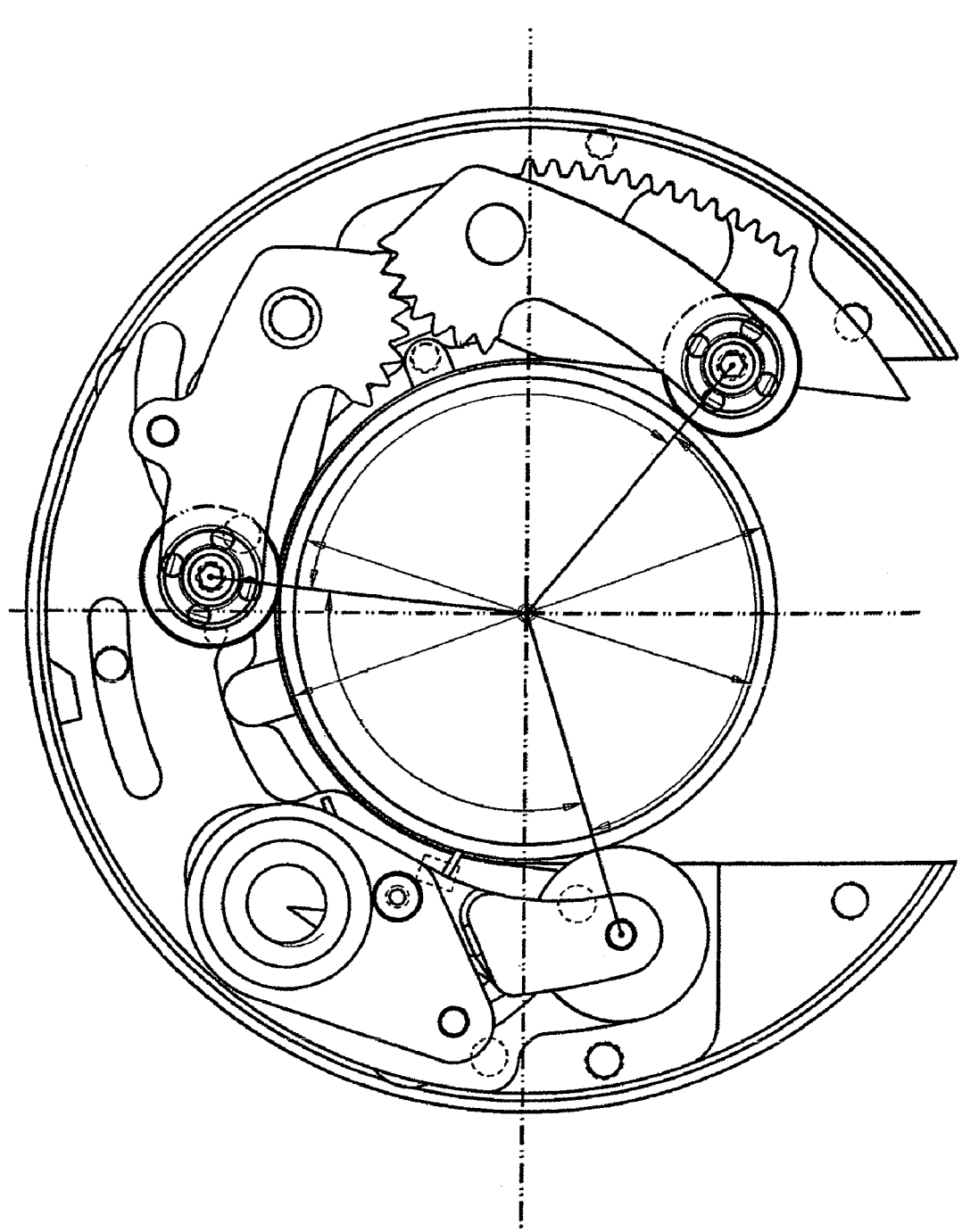
Figure 7:
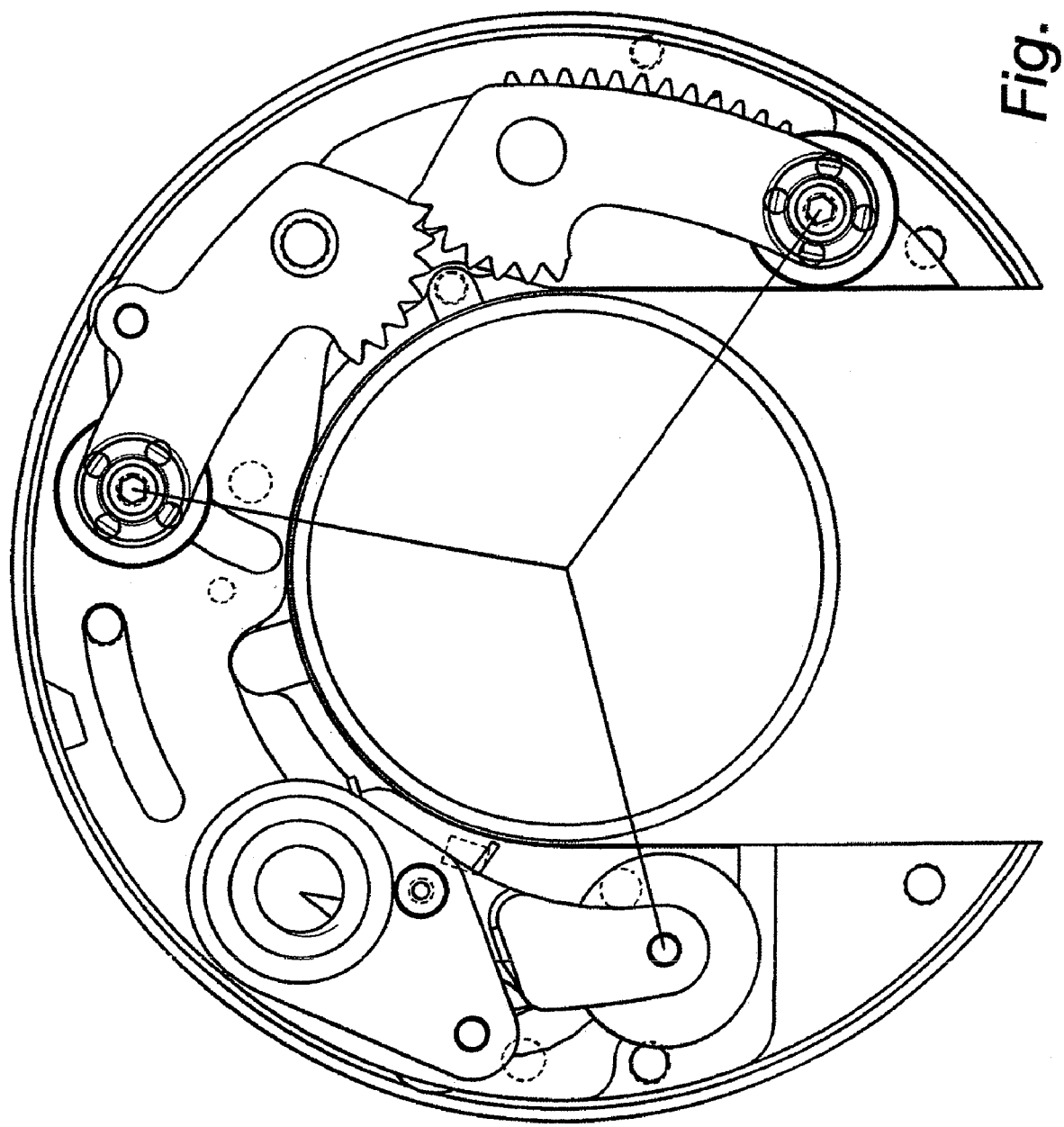

One exemplary embodiment of the invention will now be described in more detail with reference to the accompanying drawings, in which FIG. 1 shows a pipe cutting apparatus of the invention as a portable tool, FIG. 2 shows an essential part of a cutter head 1 in the pipe cutting apparatus as seen in axial direction, FIG. 3 shows a part of the cutter head of the pipe cutting apparatus in section, FIGS. 4-6 show the cutter head of FIG. 2 in various positions of its components in a cutting-ready position with various pipe diameters, and FIG. 7 shows the cutter head of FIG. 2 with the support rolls and the cutting blade in a home position.

The pipe cutting apparatus shown in FIG. 1 comprises a body, which is fitted with handles 4 and 5 and on which a cutter head 1 is rotatably mounted with bearings. The cutter head 1 has a centre rotation axis C (FIG. 2) and the cutter head 1 has a radially sideways opening cutting gap (2), through which the centre rotation axis C extends and which receives a pipe to be cut.

The apparatus is provided with a protective cover 3, which houses the cutter head 1, closes and opens the cutting gap 2, and which is displaceable back and forth in the direction of an arrow A, whereby a handle or gripping bar 3a present at the edge of the cover 3 travels from side to side across the opening in a cutter head housing. The apparatus has also a service connection 6 and an operating switch 7.

The pipe to be cut can be fixed on said centre rotation axis C by means of securing elements 8, comprising in the present case two jaws 8 which are linearly conveyable towards and away from each other with a driving screw. Accordingly, the pipe to be cut is secured immovably relative to the apparatus' body on the centre rotation axis C of the cutter head 1.

FIG. 2 illustrates components essential with regard to the operation of a cutter head. The cutter head has its body 11 fitted with a slotted crank plate 12 for rotation over a limited distance around the axis C. The slotted crank plate 12 is provided with an arcuate guide slot 15 pivoting a swing arm 16 for a support roll 21 about an axle 18. A swing arm 17 for a second support roll 21 pivots therealong about an axle 20 by means of a meshed engagement 19 between the swing arms 16, 17. A cutting blade 22 in the shape of a sharp-edged disk is rotatably mounted with bearings on the end of a cam arm 23. The cam arm 23 is bearing-mounted for pivoting about an axle 23c into a blade cradle 23b. The cam arm 23 is only capable of pivoting about the axle 23c against the load of a spring over a limited distance relative to the blade cradle 23b. This limited distance is equal to or slightly longer than the maximum wall thickness of a pipe to be cut. An arcuate guide slot 23a present in the slotted crank plate 12 is designed in such a shape that, as it is turning (the cutter head body 11 and the slotted crank plate 12 pivoting relative to each other), the blade cradle 23b carries the blade 22 towards the centre axis C over a distance substantially equal to a displacement of the support rolls 21 in response to the guide slot 15. The blade 22 must trail slightly behind to have the support rolls 21 colliding first with the pipe surface.

This approaching motion for the support rolls 21 and the blade 22 is created by means of a pulling device 13 engaging in a recess 14 in the slotted crank plate 12. The mutually responding bevel faces of the recess 14 and the pulling device 13 and the radial mobility of the pulling device 13 enable the pulling device 13 to slip off the recess 14 as the support rolls 21 collide with a pipe surface. Thus, the pivoting motion of the slotted crank plate 12 stops automatically whenever the support rolls 21 collide with a pipe surface, i.e. approaching and stopping of the motion are effected automatically with a single drive and/or control, regardless of the diameter of a pipe. In the presently described manually operated cutting apparatus, the pulling device 13 is preferably linked with a displacement A of the protective cover 3, such that the displacement of the protective cover 3 in one direction carries the support rolls 21 and the cutting blade 22 to a cutting-ready position and the displacement A in the opposite direction returns the support rolls 21 and the cutting blade 22 to a home position. Thus, upon opening the cover 3, the pulling device 13 becomes a pushing device which falls into the recess 14 and returns the slotted crank plate 12 with respect to the body 11 across a distance A'.

In reference to FIGS. 2 and 3, there will now be explained how the support rolls 21 also automatically lock themselves in any displaced position when bearing against the surface of pipes with varying diameters. The side of an elongated hole present in the slotted crank plate 12 is provided with a toothed arc 28 which is in meshed engagement with a gear 31 mounted on a crank plate shaft 30 extended through an opening 29 in the body 11. Hence, the toothed arc 28 rotates the crank plate shaft 30 as the slotted crank plate 12 is pivoted relative to the body 11 for conveying the support rolls 21 against a pipe surface. Around the crank plate shaft 30 is a freewheel clutch 32, allowing rotation of the crank plate shaft 30 in one direction, yet blocking rotation in the opposite direction. Thus, the crank plate shaft 30 and the freewheel clutch 32 function to lock the slotted crank plate 12 in any position at which the support rolls 21 collide with a pipe surface.

In order to enable returning the support rolls 21 and the blade 22 to a home position after a pipe cutting process described hereinafter, the crank plate shaft 30 must be released for rotation in both directions. In the presently depicted exemplary embodiment, the freewheel clutch 32 is encircled with a cylinder 33, its outer surface being provided with recesses 34 around its periphery, any one of these being able to receive a locking ball 35 present in a hole at a stationary cylinder 37a. The cylinder 37a houses a piston 37 held by a spring 38 in a position which blocks the escape of the locking ball 35 from the recess 34. The piston 37 has its pin 39 received in a bevel-faced groove in a release plate 40. In response to turning the release plate 40, the piston 37 is pushed by the pin 39 to a position which allows the locking ball 35 to enter a recess 36, whereby the crank plate shaft 30 is able to rotate in both directions. The turning motion of the release plate 40 can also be transmitted from the opening motion of the cover 3 by means of an appropriate linkage which releases the crank plate shaft 30 for rotation before the pulling and pushing device 13 falls into the recess 14 for rotating the slotted crank plate 12 to a home position (arrow A'). In FIG. 3, reference numerals 11a and 11b represent cover plates for the cutter head 1.

In reference to FIG. 2, there is still described an advancement of the blade 22 during a cutting operation. Once the support rolls 21 have been brought, as described above, to a cutting-ready position, rotation of the cutter head 1 is started by means of the operating switch 7. Alongside the cutter head is a star pinion 26 which, upon colliding with a detent 27, rotates over one point in every cycle of the cutter head. The star pinion 26 has a screw on its axis for slowly rotating a spindle 24 of a cam wheel 25, whereby the cam arm 23 is gradually pivoted by the cam wheel 25 about the axle 23c for advancing the blade 22 towards the centre axis C. Thus, the cam arm 23 pivots against a spring load across the above-mentioned limited distance with respect to the blade cradle 23b.

There are many structural options for implementing the above described shifting mechanism 12-20 and locking mechanism 28-40 for the support rolls 21. It is indeed essential in the invention that a single drive and/or control can be used for shifting and locking support rolls against the surface of pipes with varying diameters as this has previously required an individual setting for every pipe diameter.

The invention claimed is:

1. A pipe cutting apparatus, comprising a body, a cutter head (1) bearing-mounted rotatably on the body, having a centre rotation axis (C) and having a cutting gap (2) which opens radially sideways for receiving a pipe to be cut, pipe securing elements (8) for fixing the pipe on said centre rotation axis (C) immovably relative to the body, support rolls (21) in the cutter head (1) for supporting the pipe during a cutting process, and a cutting blade (22) in the shape of a sharp-edged disk present in the cutter head (1), which, during rotation of the cutter head (1), is adapted to be advanced towards the centre rotation axis (C) for cutting the pipe, characterized in that the cutter head (1) is provided with a shifting and locking mechanism (12-20, 28-40) for the support rolls (21), which, regardless of the diameter of a pipe to be cut, shifts and locks the support rolls (21) with a single drive and/or control against the surface of a pipe for cutting support, and wherein said shifting and locking mechanism further comprises:

a slotted crank plate (12), rotatable about said rotation axis (C) relative to the cutter head (1) and including an arcuate guide slot (15) pivoting a swing arm (16) for the support roll (21), a crank plate shaft (30), having its gear (31) meshed with a toothed arc (28) of the slotted crank plate (12) for rotating the crank plate shaft (30) as the slotted crank plate (12) is turned for shifting the support rolls (21) against the surface of a pipe, a freewheel clutch (32) in association with the crank plate shaft (30) for allowing rotational motion of the crank plate shaft (30) in a direction, yet blocking the rotational motion in an opposite direction and thereby locking the slotted crank plate (12) in any position at which the support rolls (21) collide with the surface of a pipe to be cut.

2. An apparatus as set forth in claim 1, characterized in that the freewheel clutch (32) is encircled by a clamping mechanism (34-40) for optionally locking the freewheel clutch (32) over its outer periphery for no rotation or releasing it for rotation in both directions.

3. An apparatus as set forth in claim 1, characterized in that the cutting apparatus is a portable tool with handles (4, 5), which includes a displaceable protective cover (3) that houses the cutter head (1), opens and closes the cutting gap (2) and has its displacement (A) transmitted to the shifting and locking mechanism (12-20, 28-40) of the support rolls, such that the protective cover (3) has its displacement (A) in one direction shifting the support rolls (21) and the cutting blade (22) to a cutting-ready position and its displacement (A) in the opposite direction returning the support rolls (21) and the cutting blade (22) to a home position in which the cutting gap (2) is vacant.

4. An apparatus as set forth in claim 3, characterized in that the freewheel clutch (32) is encircled by a clamping mechanism (34-40) for optionally locking the freewheel clutch (32) over its outer periphery for no rotation or releasing it for rotation in both directions.

5. A pipe cutting apparatus, comprising a body, a cutter head (1) bearing-mounted rotatably on the body, having a centre rotation axis (C) and having a cutting gap (2) which opens radially sideways for receiving a pipe to be cut, pipe securing elements (8) for fixing the pipe on said centre rotation axis (C) immovably relative to the body, support rolls (21) in the cutter head (1) for supporting the pipe during a cutting process, and a cutting blade (22) in the shape of a sharp-edged disk present in the cutter head (1), which, during rotation of the cutter head (1), is adapted to be advanced towards the centre rotation axis (C) for cutting the pipe, characterized in that the cutter head (1) is provided with a shifting and locking mechanism (12-20, 28-40) for the support rolls (21), which, regardless of the diameter of a pipe to be cut, shifts and locks the support rolls (21) with a single drive and/or control against the surface of a pipe for cutting support characterized further in that the cutting apparatus is a portable tool with handles (4, 5), which includes a displaceable protective cover (3) that houses the cutter head (1), opens and closes the cutting gap (2) and has its displacement (A) transmitted to the shifting and locking mechanism (12-20, 28-40) of the support rolls, such that the protective cover (3) has its displacement (A) in one direction shifting the support rolls (21) and the cutting blade (22) to a cutting-ready position and its displacement (A) in the opposite direction returning the support rolls (21) and the cutting blade (22) to a home position in which the cutting gap (2) is vacant.

* * * * *